(12) United States Patent  
Bryant

(10) Patent No.: US 7,777,937 B2
(45) Date of Patent: Aug. 17, 2010

(54) METHOD AND SYSTEM TO AUTOMATICALLY CORRECT PROJECTED IMAGE DEFECTS

(75) Inventor: Frank Bryant, Denton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 12/366,929

(22) Filed: Feb. 6, 2009

(65) Prior Publication Data

US 2009/0147346 A1 Jun. 11, 2009

Related U.S. Application Data

(62) Division of application No. 11/324,116, filed on Dec. 30, 2005, now Pat. No. 7,505,194.

(51) Int. Cl.
*G02B 26/00* (2006.01)
(52) U.S. Cl. ..................................... 359/291
(58) Field of Classification Search ................. 359/291, 359/292, 296, 297, 298; 348/57, 241, 246, 348/247, 273, 333.02
See application file for complete search history.

(56) References Cited

U.S. PATENT DOCUMENTS 5,633,691 A 5/1997 Vogeley et al.
5,875,013 A * 2/1999 Hiroshi ........................ 349/110
6,618,185 B2 * 9/2003 Sandstrom ................... 359/292
6,971,748 B2 12/2005 Cho et al.
7,106,089 B2 * 9/2006 Nakano et al. ............... 324/770
7,167,148 B2 1/2007 Richards

* cited by examiner

*Primary Examiner*—Timothy J Thompson
*Assistant Examiner*—Tuyen Q Tra
(74) *Attorney, Agent, or Firm*—Lisa X. Jorgenson; Fleit Gibbons Gutman Hongini & Bianco PL

(57) ABSTRACT

An apparatus is provided that includes a light source, an array of light-reflecting devices, and a processor for positioning the light-reflecting devices so as to display an image on the display screen. Each of the light-reflecting devices selectively reflects the light from the light source onto a corresponding pixel of a display screen. The processor positions a first of the light-reflecting devices such that light from the light source is reflected by the first light-reflecting device onto a first pixel of the display screen, which is different than the pixel of the display screen that corresponds to the first light-reflecting device. A similar apparatus is also provided in which the processor instead positions the first light-reflecting device such that light from the light source is reflected by the first light-reflecting device onto a first area of the display screen, which is located between the pixels of the display screen that correspond to the first light-reflecting device and an adjacent second light-reflecting device.

12 Claims, 9 Drawing Sheets ized into a large number of samples (for example, 1,310,000 samples) for each color. Each mirror in the DLP system
METHOD AND SYSTEM TO AUTOMATICALLY CORRECT PROJECTED IMAGE DEFECTS

CROSS-REFERENCE TO RELATED APPLICATIONS

This application is a divisional of prior U.S. application Ser. No. 11/324,116, filed Dec. 30, 2005, now U.S. Pat. No. 7,505,194. The entire disclosure of U.S. application Ser. No. 11/324,116 is herein incorporated by reference.

FIELD OF THE INVENTION

The present invention relates generally to video projection devices, and more specifically to detecting and correcting defects in projected images.

BACKGROUND OF THE INVENTION

Although sites and sounds, as they exist in nature, are analog, the advantages of recording and storing them in a digital format have been known for years. A digitally recorded image or sound is stored on digital media as a series of 1's and 0's. When reproduced, an exact copy of the original recording is obtained. The clarity of the digital recording can be immediately appreciated.

One of the first types of digital media introduced to the consumer market was the compact disk (CD), which replaced vinyl records and tapes. Since then, many other types of digital media, such as digital tapes, DVDs, Flash memory devices, and others have been introduced and are in widespread use. Because the digital recordings are only values of 1's and 0's, in stark contrast to the previously-used analog method of recording, all generations of copies of a digital recording have the same quality as the original.

To display analog video, a scanning device systematically and continuously moves across the screen placing a portion of the image to be displayed at each address, or "pixel." A magnetic field is used to direct the electrons to that address. The scanning occurs so rapidly that the human eye cannot detect that the entire picture is not displayed at once. Because the scanning device is responsible for displaying every pixel in an image, if the single scanning device would fail, no image would display and the display unit would be rendered worthless.

Very recently, several new technologies have emerged that allow digital video to be displayed. At the forefront is a projection display technology called Digital Light Processing™ (DLP™). DLP televisions and projectors utilizing matrices of 800 to over a million "microelectromechanical systems" (MEMS) devices known as Digital Micromirror Devices (DMDs). A DMD is a fast, reflective, digital light switch.

Referring to FIG. 1, a DMD 100 is shown. The DMD includes a mirror 102 located above and attached to a semiconductor chip 104 by a post 106. The mirror 102 and post 106 rest on a yoke 108 supported by a hinge 110. The yoke 108 is attached to a center of the hinge 110 and each of two ends of the hinge 110 is terminated into a hinge support 120.

On opposite longitudinal sides of the hinge 110 are electrodes 112 and 114. Each electrode 112 and 114 is attached to an individual address pad 116 and 118, respectively, by electrode support posts 122 and 124, respectively. The hinge supports 120 are supported by a bias/reset bus 126 and are attached by a pair of hinge support posts 128.

When stimulated by a voltage generated from either of the electrodes 112 or 114, the yoke 108 and mirror 102 pivot along the hinge 110. The limits of the pivot motion are defined by contact points where the yoke 108 makes contact with landing sites 130 on the bias/reset bus 126 surface. Typically, the mirror pivots a total of about 20°.

All images on a screen are actually made of a matrix of small "pixels." In DLP devices, each mirror corresponds to an individual pixel on the screen. If the mirror reflects light onto its assigned pixel, the pixel becomes energized and is illuminated.

More specifically, each DMD is addressable and completely independent of the other DMDs. A processor directs applied voltages to the electrodes 112 and 114 so as to cause each DMD to pivot in a desired direction. By pivoting a mirror from one contact point 118 to the other 116, light for a pixel of an image can be directed to one of two places: a display screen or a light absorbing area. Referring now to FIG. 2, it can be seen that when light is directed from a source 302 to one or more of the mirrors 102 in a first position 204, that light is reflected to a display screen 324 in a location corresponding to the mirror's position within the array of mirrors. When one or more of the mirrors 102 is in a second position 210, the light is reflected to a second location, such as a light absorbing area 322. By varying the mirrors 102 between the two positions, each mirror 102 operates as a digital on/off light switch.

To place an image on the screen of a DLP device, the image is separated into its red, blue, and green components and digitized into a large number of samples (for example, 1,310,000 samples) for each color. Each mirror in the DLP system is assigned one of these samples. A color wheel is placed between a light source and the DMD. The color wheel continuously rotates between the primary colors so that each color is serially projected onto the DMD mirrors. By switching on and off, the DMDs determine which pixels on the screen receive each color. Amazingly, a DMD mirror is capable of switching thousands of times per second. Varying the duty cycle, or amount of time each individual DMD mirror is on, allows over 16 million different colors to be displayed from the single light source and primary color wheel.

Because there are a very large number of moving micromirrors that are each separated by only a small distance (for example, only 1 μm) on a DMD chip, DLP devices suffer from the disadvantage that manufacturing is difficult and results in a great number of defective chips. Even the smallest contaminate, such as dust or moisture, can prevent one or more mirrors from operating properly. Additionally, because of the extraordinarily large number of movements required in the life of each DMD switch, failures of individual switches in the DLP matrix can be expected.

In a DLP device, if one of the DMD mirrors is defective, its corresponding pixel on the screen will show a "dead," or black, spot if the mirror is stuck in the "off" position.

SUMMARY OF THE INVENTION

Briefly, in accordance with one embodiment of the present invention, disclosed is an apparatus that includes a light source providing light, an array of light-reflecting devices that each have a movable reflective surface, and a processor for receiving image information and positioning the reflective surfaces of the light-reflecting devices so as to display the image on the display screen. Each of the light-reflecting devices selectively reflects the light from the light source onto a corresponding pixel of a display screen, and the processor positions the reflective surface of at least one of the light-reflecting devices such that the light from the light source is reflected by the one light-reflecting device onto a first pixel of the display screen, which is different than the pixel of the display screen that corresponds to the one light-reflecting device.

Another embodiment of the present invention provides a method for compensating for a defective light-reflecting device within an array of light-reflecting devices. According to the method, there is identified a first light-reflecting device that is defective, and at least a second light-reflecting device is positioned such that the light from the light source is reflected by the second light-reflecting device onto the pixel of the display screen that corresponds to the first light-reflecting device.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
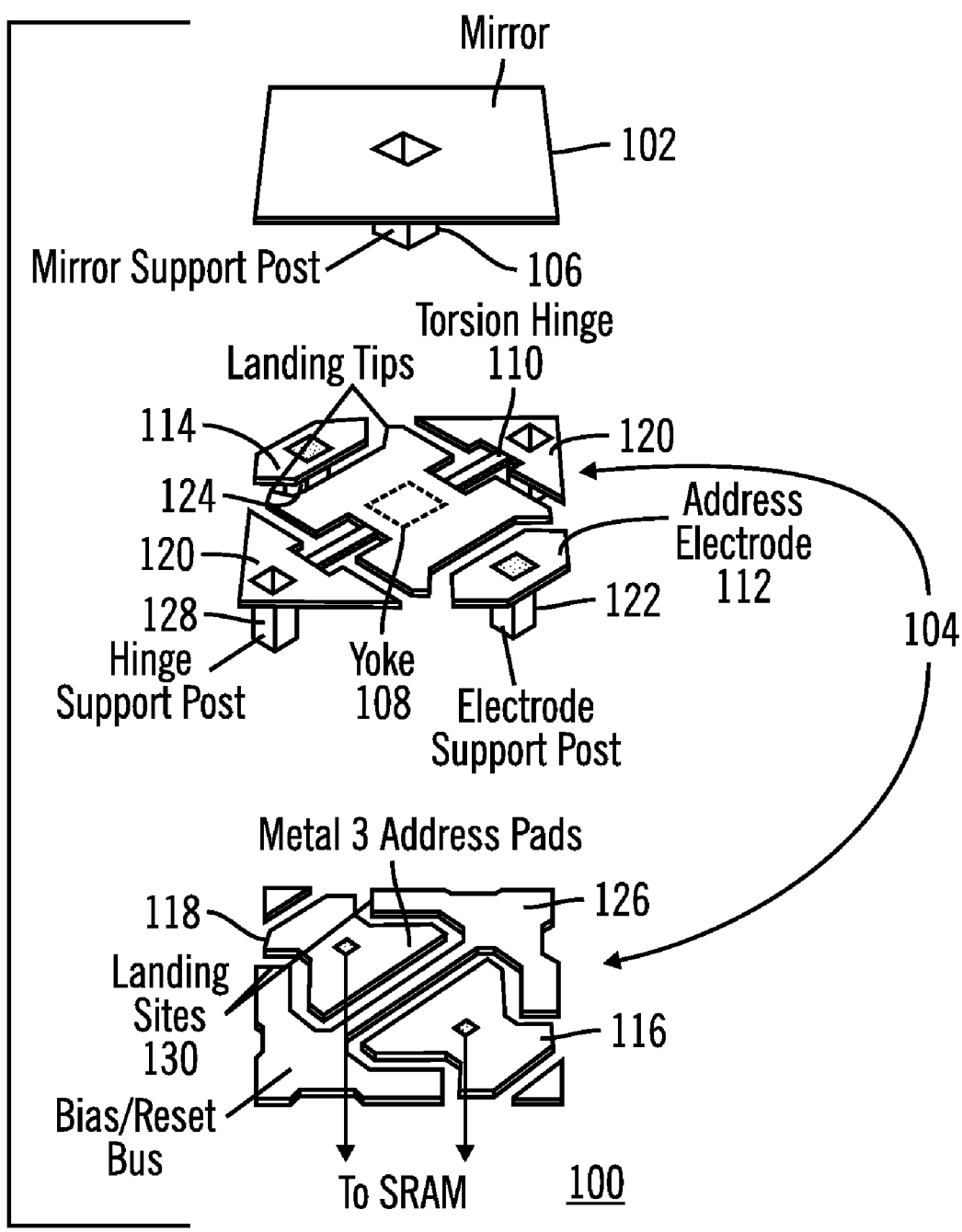
FIG. 1 is a diagram illustrating a Digital Micromirror Device (DMD).
Figure 2:
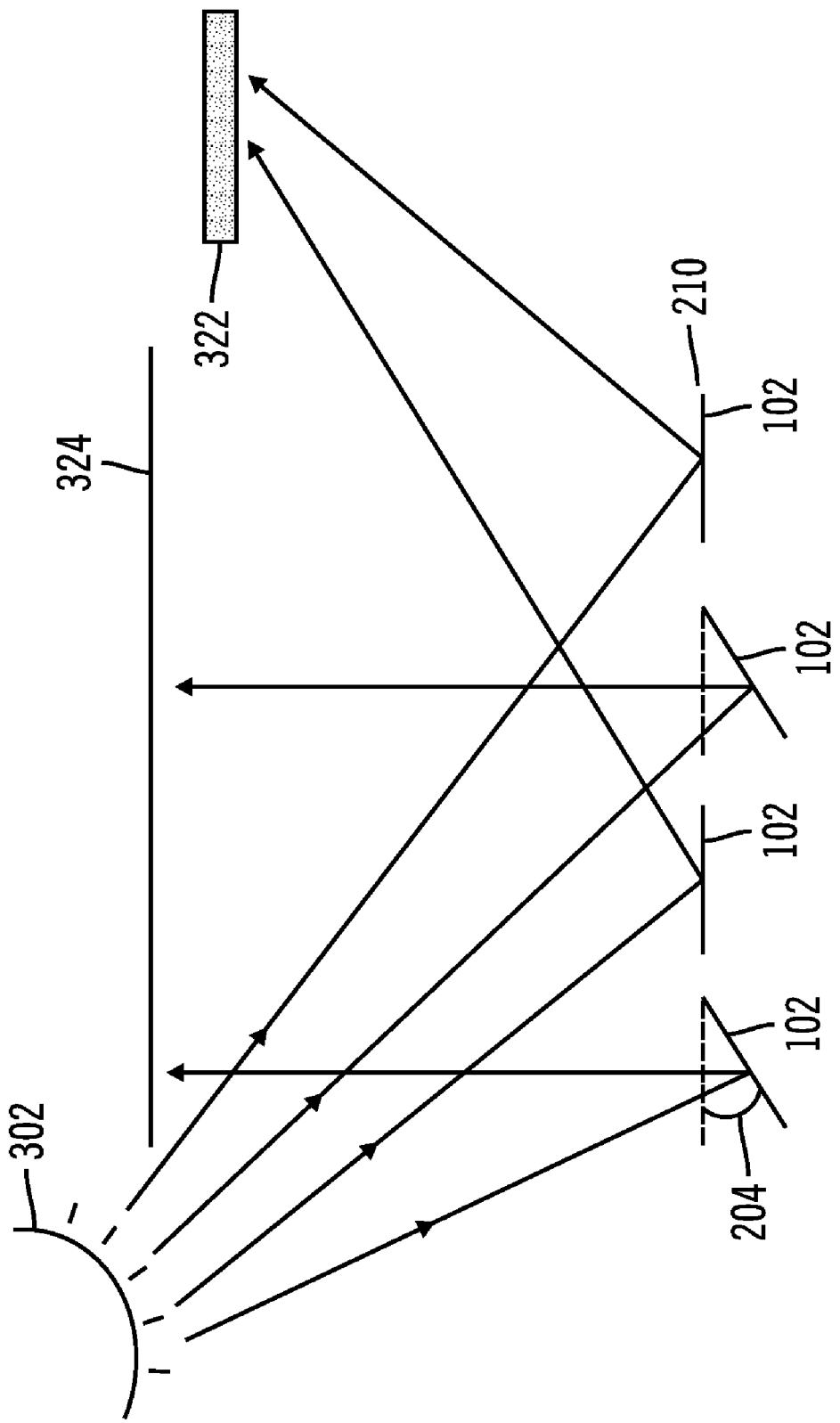
FIG. 2 is a diagram illustrating the functionality of the DMD of FIG. 1.

While the specification concludes with claims defining the features of the present invention that are regarded as novel, it is believed that the present invention will be better understood from a consideration of the following description in conjunction with the drawing figures, in which like reference numerals are carried forward. It is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the present invention.

The present invention, according to a preferred embodiment, provides a device that detects and compensates for one or more non-functioning light-reflecting switches in a digital light-reflecting imaging device.

Figure 3:
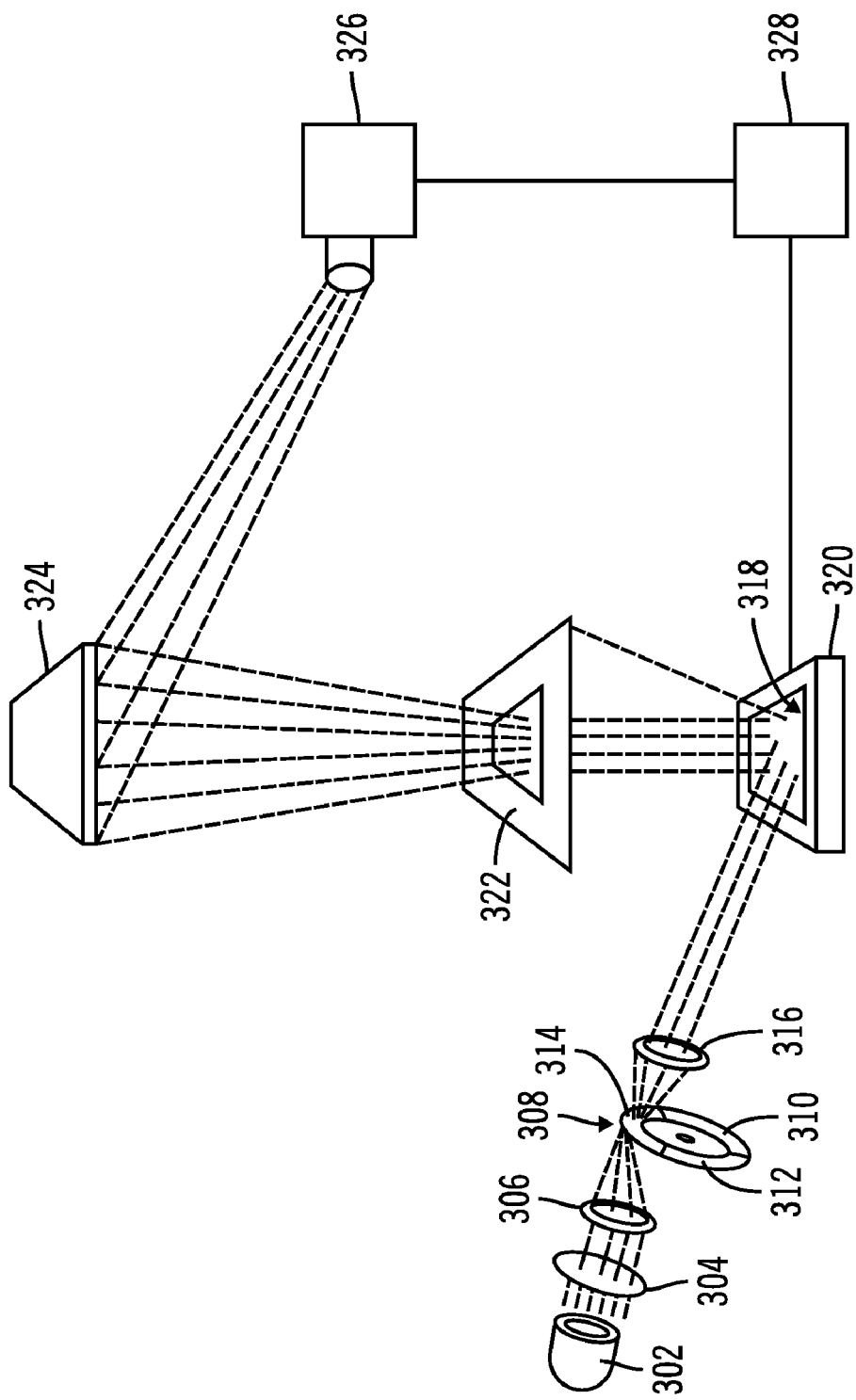
FIG. 3 is a block diagram illustrating a Digital Light Projection (DLP) device.

FIG. 3 shows a digital light projection (DLP) system according to one embodiment of the present invention. As shown, the DLP system 300 has a light source 302 that projects homochromatic light rays 304 at a condensing lens 306. Although the present invention can operate with a light source 302 that produces colors other than white, in this embodiment of the present invention, only white light is output from the light source 302.

The condensing lens 306 has at least one convex surface exposed to the light source 302. The light rays 304 output from the light source 302 pass through the convex surface of the condensing lens 306. The condensing lens 306 causes the light rays 304 to substantially converge and pass through a color wheel 308 that is provided on the side of the condensing lens 306 that is opposite the light source 302.

In this embodiment of the present invention, the color wheel 308 is provided with at least three opaque areas 310, 312 and 314 of different colors. Although many colors can be selected, in this embodiment of the present invention, the areas 310, 312, and 314 are the primary colors red, blue, and green. The color wheel is coupled to a driving motor that spins the wheel. In this embodiment of the present invention, the wheel spins at a constant velocity and each color is exposed to the light rays 304 for an equal amount of time. However, in other embodiments, the color areas 310, 312, and 314 are not of equal sizes, and, as a result, the light rays 304 are projected through a particular color area more than one or more other colors areas.

After passing through the color wheel 308, the light rays 304 diverge until reaching a shaping lens 316. The shaping lens 316 presents a convex surface facing away from the light source 302. The convex surface causes the light rays 304 to exit the shaping lens 316 substantially parallel to each other. The light rays 304 are projected onto an array 318 of DMDs 100 that are provided on a chip 320.

An exemplary DMD is shown in FIG. 1. As discussed above with reference to FIG. 1, a DMD has a mirror 102 located above and attached to a semiconductor chip 104. When stimulated by a voltage generated from either one of two electrodes 112 and 114 on the chip 104, the mirror 102 pivots along a hinge 110. The limits of the pivot motion are defined by contact points where the yoke 108 makes contact with landing sites 130 on the bias/reset bus 126 surface. Typically, the mirror pivots a total of about 20°. Each DMD is addressable and completely independent of the other DMDs. By pivoting the mirror from one contact point 118 to the other 116, the DMD acts as a digital light "switch" and directs a light beam to one of two places. While this embodiments of the present invention has an array of DMDs (Digital Micromirror Devices), this is only by way of example and the present invention is not so limited. The present invention is applicable to any apparatus that includes an array of light-reflecting devices that have movable reflective surfaces.

Spaced away from the array 318 of DMDs 100 is a light absorbing material 322. The light absorbing material 322 can be any substance that prevents light from reaching a display screen 324. Because space in a display device is at a premium, there may be relatively little room between the light absorbing material 322 and other components, such as the DMDs 100. Therefore, it is desirable to reduce or eliminate reflections off of the light absorbing material 322. In this embodiment of the present invention, the light absorbing material 322 is a flat-black matte.

Figure 4:
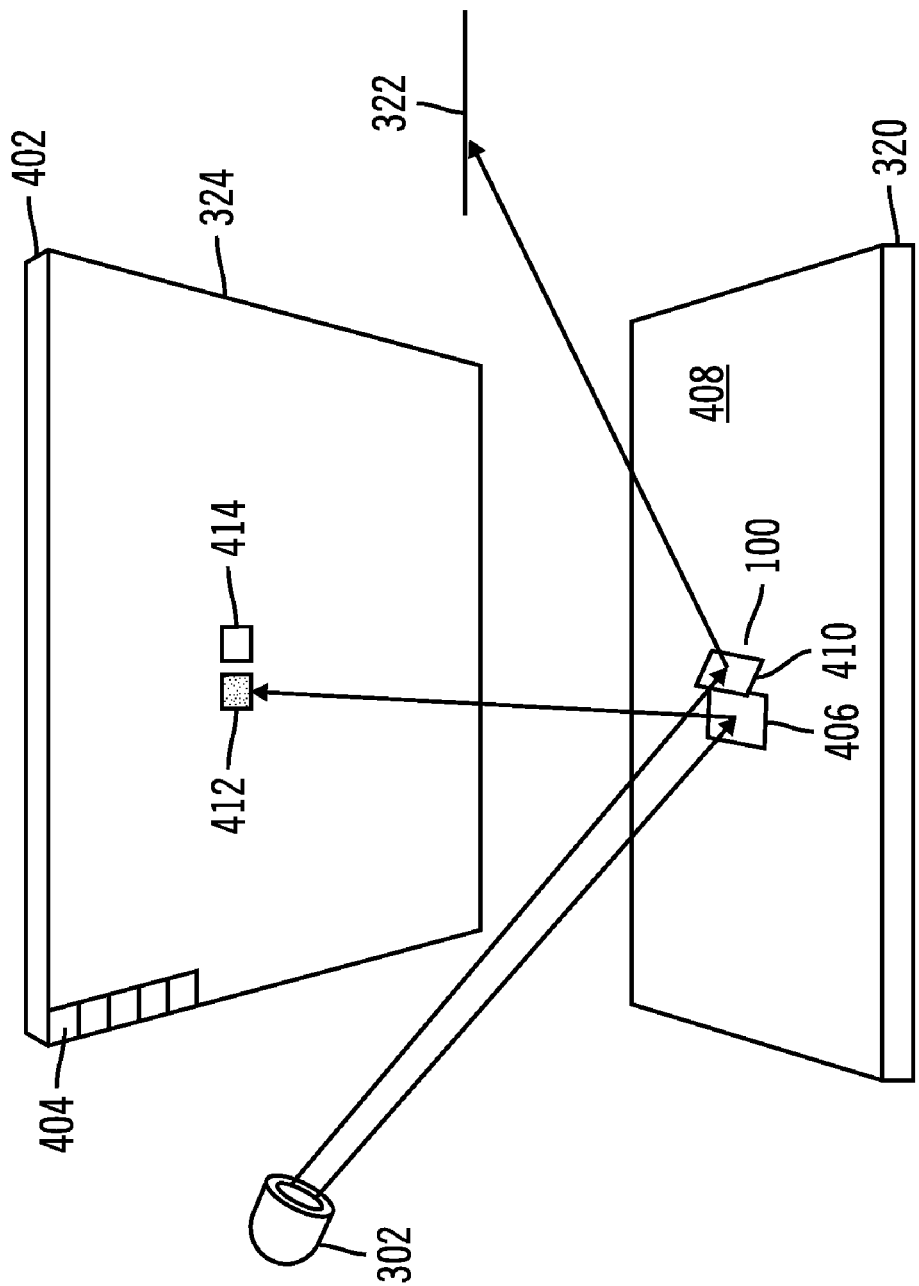
FIG. 4 is a diagram illustrating a non-functioning micromirror device.

An unobstructed pathway is also provided from the array 318 of DMDs 100 to the display screen 324. As shown in FIG. 4, the display screen 324 includes an array 402 of m×n pixels 404. In the DLP system 300, each pixel 404 corresponds to a single DMD 100 on the chip 320. When a DMD 100 is in a first position 406, i.e., parallel to an upper surface 408 of the chip 320, light is reflected from the source 302 to a pixel 412 on the display 324. When a DMD 102 is in a second position 410, i.e., not parallel to the upper surface 408 of the chip 320, light is reflected from the source 302 to the light absorbing material 322.

When the light is reflected onto a particular pixel 404 on the screen 402, that pixel glows the color of the light directed at it. When the light is reflected onto the light absorbing material, the pixel changes back to the color of the screen. The color wheel 308 continuously spins and selected pixels are hit with the colors. The process takes place at such a high speed that the human eye cannot detect the cyclical application of the colors to individual pixels. By controlling the amount of time that each colored light is directed at a pixel, shades of a color are obtained and mix at high speeds to produce the perceived color of the pixel.

The image to be displayed is divided into an m×n array of small sections. In the DLP system, each of the m×n pixels 404 on the screen 402 is assigned one of the m×n sections of the image. The mirror 102 assigned to that pixel 404 is responsible for applying the proper color for the appropriate duty cycle to that particular pixel. If that mirror is incapable of changing its reflecting angle, the pixel is a visibly detectable "dead spot" that appears on the screen. A "dead spot" can be a pixel that is never illuminated, such as pixel 414 in FIG. 4. This occurs because mirror 410 is frozen at an angle that does not direct light to the pixel. Alternatively, mirror failures occur so that a pixel is always on, such as pixel 412 in FIG. 4. This occurs when a mirror 406 is frozen at an angle that always directs light to its corresponding pixel. Because physically repairing a single defective mirror is difficult and expensive (if not impossible) and replacing an entire unit due to a defective mirror is expensive, embodiments of the present invention compensate for a defective mirror by using one or more adjacent mirrors to properly illuminate dead spots. Further, if each array is required to be manufactured free of any defective mirrors, this leads to low production yields that keep production costs (and thus prices) high. Thus, the in-situ defect reduction technology of the present invention can reduce production costs by increasing yield (i.e., because 100% of the mirrors do not have to be working to produce a commercially-acceptable device).

Preferred embodiments of the present invention provide a detection system for recognizing a non-functioning mirror. Although any method of detecting a non-functioning mirror is within the scope of the present invention, the embodiment of the present invention shown in FIG. 3 utilizes a camera 326 to detect dead spots on the screen 324. The camera 326 captures an image of the display screen and (digitally) communicates the image to a comparator 328. The comparator 328 also receives, from the DLP processor 320, information representing the image that should appear on the screen 324. By breaking the image received from the camera 326 into a coordinate fixed frame graph, the comparator 328 is able to compare pixel-by-pixel the displayed image with the intended image received from the DLP processor 320. (Such a comparator is well-known so it will not be described in detail.) If one or more pixels of the displayed image do not match the intended image, it is determined that a mirror corresponding to that particular pixel is inoperative. That information is then fed back to the processor 320 to be used for image correction.

Figure 5:
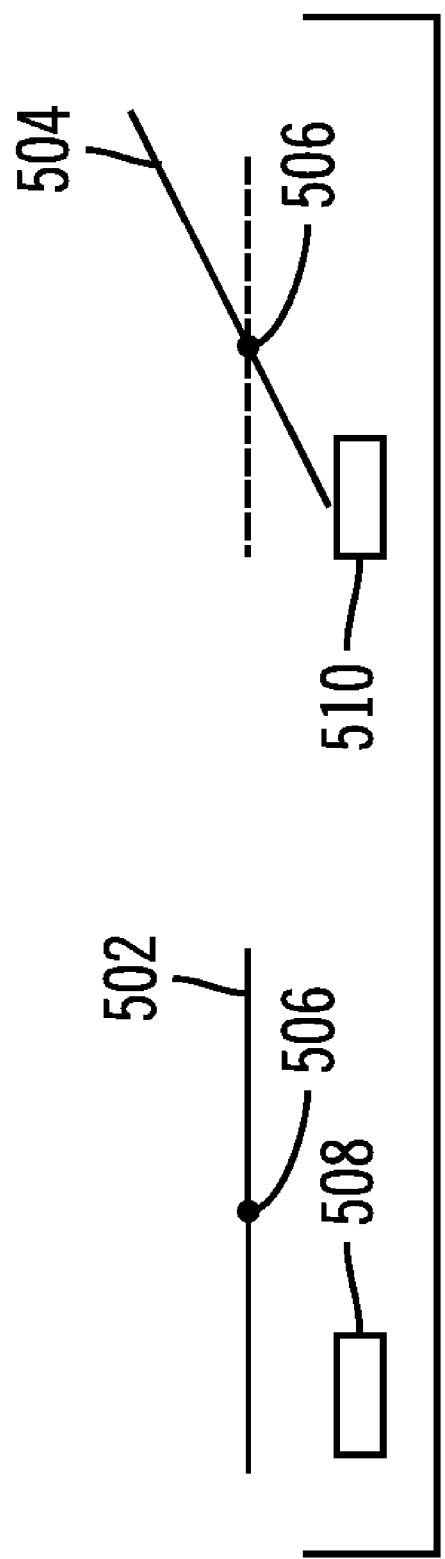
FIG. 5 is a block diagram illustrating a device for detecting a defective micromirror device in accordance with an embodiment of the present invention.

In another embodiment of the present invention, as shown in FIG. 5, a non-functioning mirror is detected through the use of a capacitance sensing device. FIG. 5 shows two mirrors 502 and 504, which are each capable of pivoting at a pivot point 506 along the length of the mirror. The mirror or the mirror-supporting substrate is an electrically conducting metallic material and acts as a plate in a capacitor. Below each of the two mirrors 502 and 504 are provided stationary capacitance sensing devices 508 and 510, respectively. Because of its proximity to the capacitance sensing device 508, mirror 502 produces a different capacitance value than does mirror 504 and its capacitance sensing device 510.

The sensing devices 508 and 510 sense and communicate capacitances to a comparator or other processing device, or they can be self-contained capacitance-sensing units that detect mirror failure without the need for a comparator or processor. By sensing the capacitance values, it can be determined whether one of the mirrors is stationary or non-functioning when a signal is sent to the mirror that should cause the mirror to move and take on a specific or different capacitance.

In yet another embodiment, defect detection is provided by measuring capacitance changes without additional architecture in the array. More specifically, the components that are used to move the individual light-reflecting devices (i.e., the reference electrode and the electrode with a potential) have a given capacitance. When deflection occurs as a result of changing the potential, this capacitance also changes. A sensing circuit is provided remote to the light-reflecting devices (preferably on the same chip 320, but possibly connected to it, such as block 328). The sensing circuit senses the capacitance and detects if an incorrect capacitance signal is sensed (e.g., by comparing it to the expected capacitance based on the electrode potentials, or by determining if the capacitance changes when the electrode potential changes). The sensing circuit indicates which individual light-reflecting devices are defective. In one embodiment, each movable light-reflecting device is checked by the sensing circuit at startup and/or during a rest phase of operation. In another embodiment, the sensing circuit operates in real time with closed loop feedback.

Figure 6:
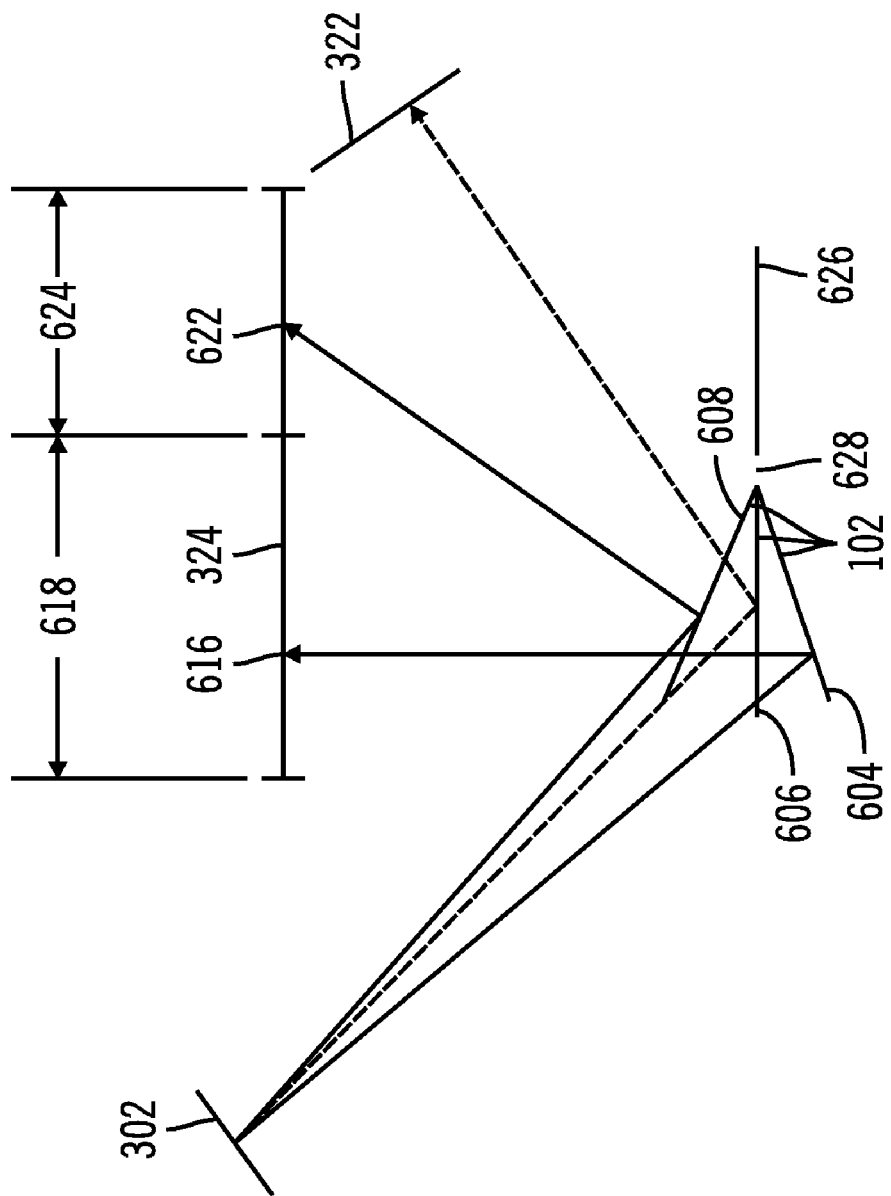
FIG. 6 is a diagram illustrating a three-position device for compensating for a defective micromirror device in accordance with one embodiment of the present invention.

FIG. 6 shows the image correction process of one embodiment of the present invention. After a defective light-reflecting device 626 is identified, the image correction process will compensate for the defective device.

In particular, an adjacent mirror 102 has at least three stationary positions 604, 606, and 608. The light source 302 shines light at the mirror 102. When the processor 320 puts the mirror 102 into the first position 604, the light is reflected onto the display screen 324 at a pixel 616 corresponding to the mirror's position within the array 318 of light-reflecting devices. When the processor 320 puts the mirror 102 in a second position 606, light is reflected from the light source 302 to an area 322 other than the display screen 324.

According to this exemplary embodiment, there is at least a third position 608 in which the processor 320 can position the mirror 102 so that it will remain there at least temporarily so as to reflect light from the light source 302 to a second location 622 on the display screen 324 that corresponds to a pixel of the defective mirror 626 within the array.

The three positions 604, 606, and 608 allow light to be directed by the processor so as to compensate for the non-functioning mirror 626 that is located adjacent to mirror 102.

The term "adjacent" means at a close proximity, but is not limited to mirrors that are "next to" each other.

Figure 7:
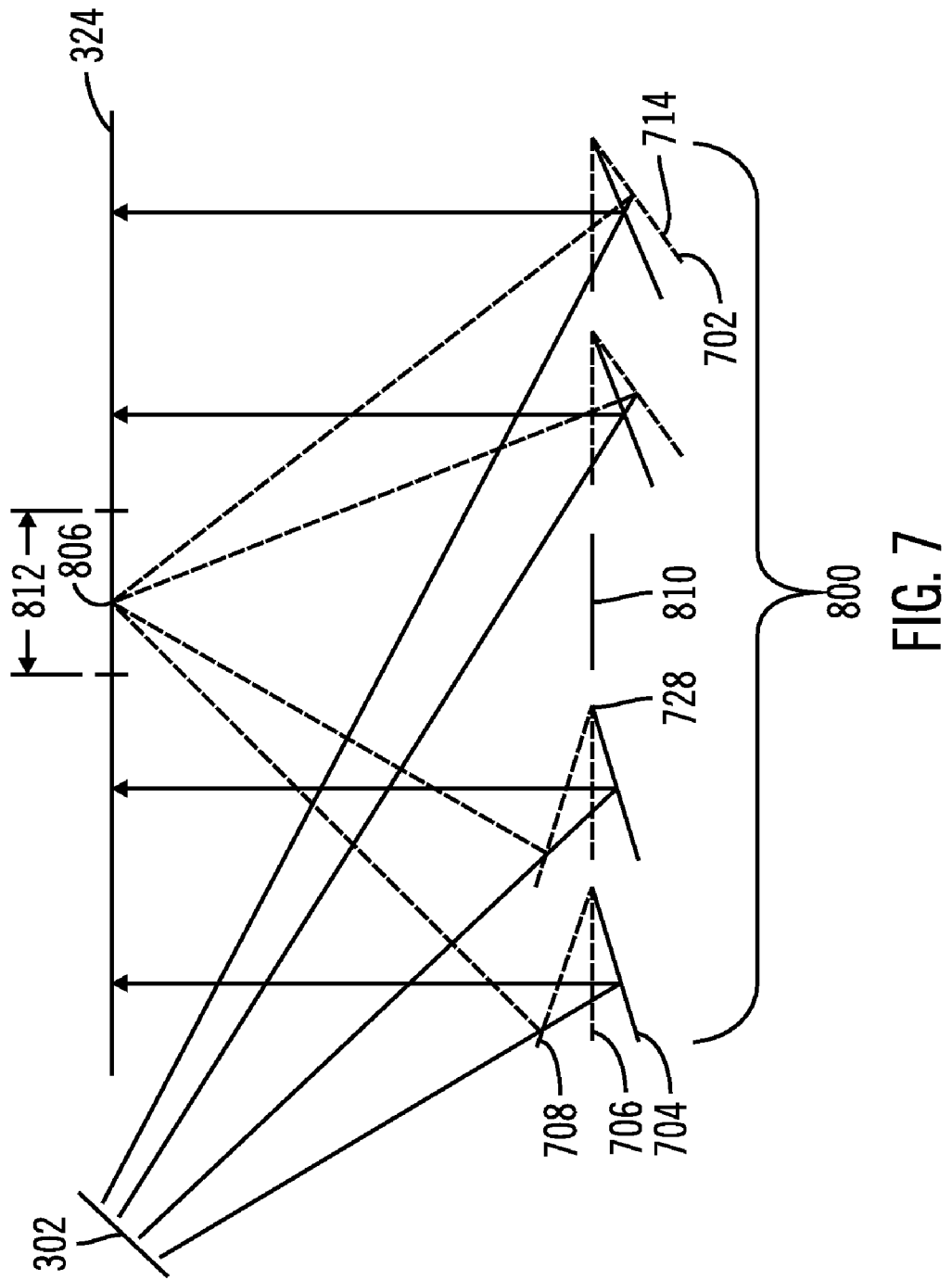
FIG. 7 is a diagram illustrating a four-position device for compensating for a defective micromirror device in accordance with another embodiment of the present invention.

FIG. 7 shows another embodiment of the present invention in which the processor 320 uses multiple mirrors to reflect light onto a pixel on the display screen that corresponds to a defective mirror. As shown, the processor 320 an position each mirror 102 in a fourth position 714 that reflects light in a direction back toward the light source 302. Having at least these four positions 704, 706, 708, and 714 allows the processor 320 to cause each mirror to reflect light to either of its two sides so as to allow compensation for a non-functioning mirror on either side, and to allow multiple adjacent mirrors to compensate for a non-functioning mirror. For example, multiple mirrors can be controlled by the processor to alternately light the defective mirror's pixel so that the pixel is in sum lighted for its required duty cycle. By using multiple mirrors, each of these mirrors can have more time to satisfy their own pixel's required duty cycle.

While both FIG. 6 and FIG. 7 show the mirrors 102 pivoting at an end 728 of the mirror, in other embodiments the mirrors 102 pivot at points other than an end, such as at a midpoint as shown in FIG. 5.

Figure 8:
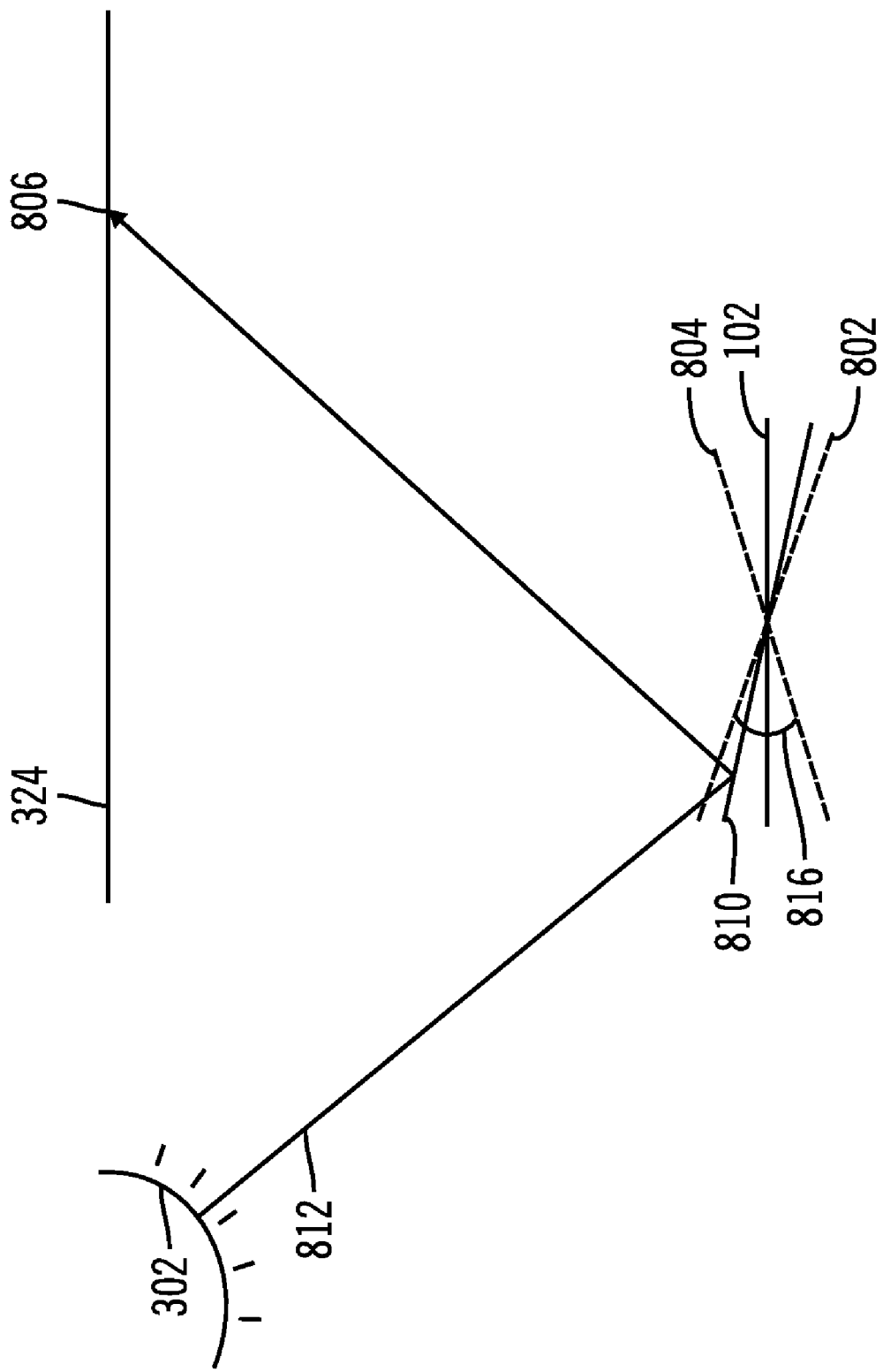
FIG. 8 is a diagram illustrating a variable-position device for compensating for a defective micromirror device in accordance with yet another embodiment of the present invention.

In another embodiment of the present invention, as shown in FIG. 8, a defective mirror is compensated for by cycling an adjacent mirror's pivotable reflective surface between two positions 802 and 804. To direct reflected light to a location 806 on the display screen 324 adjacent to the mirror's location within the array, the processor 320 varies the duty cycle of the pivotable reflective surface 102 so that an average position 810 of the reflective surface 102 reflects light from the light source 302 to the desired location 806.

The duty cycle of the mirror 102 is varied by the processor 320 by alternately sending voltages to the addressable electrodes 112 and 114. By alternating the voltages, the reflective surface of the light-reflecting device will "flutter" back and forth traveling through a plurality of angles 816. By controlling the "flutter" distance and number of travels through a particular angle, the processor 320 can control the mirror so that light is directed to a particular point on the screen 324. Further, the mirror does not need to make a full stop at the defective pixel. When sharing light with an adjacent pixel, the mirror can just flutter and slow down when going past the location of the adjacent pixel so as to add more light to the pixel.

To fix a bright pixel on the screen, adjacent pixel darker colors are blended to minimize the light spot (although it cannot be made black). To fix a dark pixel on the screen, adjacent pixel light colors are blended to minimize the dark spot, or a portion of the duty cycle or standby time from an adjacent light-reflecting device is employed to replace or mitigate loss of the defective pixel's light.

Any method of using one or more mirrors to illuminate an adjacent pixel that corresponds to a non-functioning mirror is within the scope of the present invention. Embodiments of the present invention provide for the illumination of a defective pixel as well as the pixels assigned to functioning mirrors through the sharing of one or more functioning mirrors. The illumination of the defective pixel can be performed by a single adjacent mirror or can be shared between multiple mirrors. The illumination of the defective pixel by adjacent mirrors results in a display screen that appears to the viewer as though the defective mirror is functioning properly (i.e., the dead spot is made less obvious, or even completely removed). Additionally, light-reflecting devices other than the mirrors described above can be used within the scope of the present invention.

Figure 9:
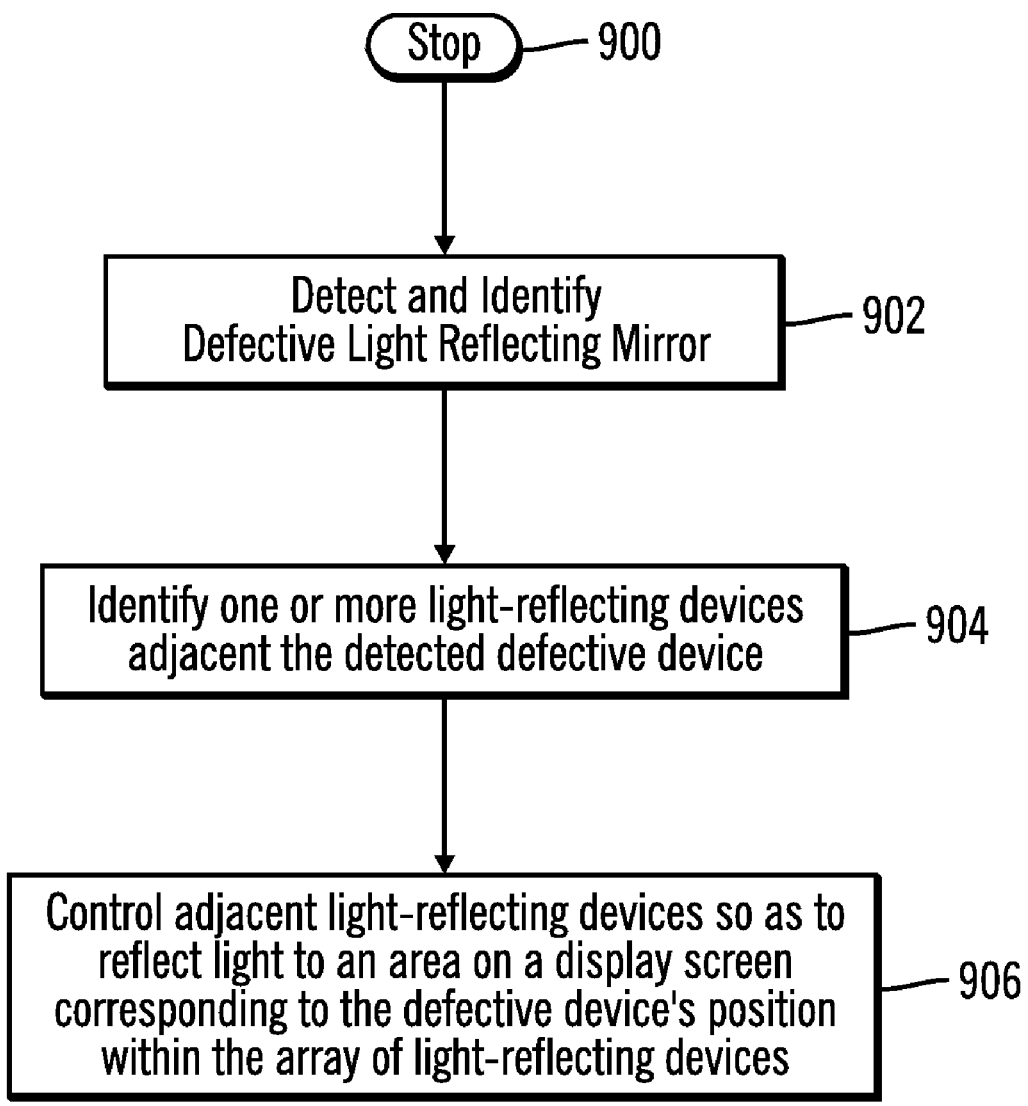
FIG. 9 is a flow diagram of the defective micromirror compensation process in accordance with a preferred embodiment of the present invention.

FIG. 9 is a flow diagram of a process for compensating for a defective micromirror device in accordance with an embodiment of the present invention. The flow begins at step 900 and moves directly to step 902, where a defective light-reflecting device is detected and identified. In the second step 904, one or more light-reflecting devices adjacent the detected defective device are identified. In a third step 906, the one or more adjacent light-reflecting devices are controlled by a processor so as to reflect light to an area on a display screen corresponding to the defective device's position within the array of light-reflecting devices.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for compensating for a defective light-reflecting device, the method comprising the steps of:
    providing an array of light-reflecting devices for selectively reflecting light from a light source onto a display screen that has an array of pixels, each of the light-reflecting devices corresponding to one and only one of the pixels of the display screen and having a movable reflective surface for selectively reflecting light from the light source onto the corresponding pixel of the display screen, with a first of the light-reflecting devices corresponding to a first pixel of the display screen and a second of the light-reflecting devices corresponding to a second pixel of the display screen, which is different than the first pixel of the display screen;
    identifying the first light-reflecting device as being defective;
    positioning the reflective surface of the second light-reflecting device in a first position such that the light from the light source is reflected by the second light-reflecting device onto a light absorbing material; and
    positioning the reflective surface of the second light-reflecting device in a second position such that the light from the light source is reflected by the second light-reflecting device onto the first pixel of the display screen that corresponds to the first light-reflecting device.

2. The method according to claim 1, wherein the second light-reflecting device is adjacent to the first light-reflecting device in the array.

3. The method according to claim 1, further comprising the step of positioning the reflective surface of the second light-reflecting device in a third position such that the light from the light source is reflected by the second light-reflecting device onto the second pixel of the display screen that corresponds to the second light-reflecting device.

4. The method according to claim 3, further comprising the steps of:
   positioning the reflective surface of a third of the light-reflecting devices in a first position such that the light from the light source is reflected by the third light-reflecting device onto the light absorbing material;
   positioning the reflective surface of the third light-reflecting device in a second position such that the light from the light source is reflected by the third light-reflecting device onto the first pixel of the display screen that corresponds to the first light-reflecting device; and
   positioning the reflective surface of the third light-reflecting device in a third position such that the light from the light source is reflected by the third light-reflecting device onto a third pixel of the display, the third light-reflecting device corresponding to the third pixel of the display screen, which is different than the first and second pixels of the display screen.

5. The method according to claim 3, further comprising the step of positioning the reflective surface of the second light-reflecting device in a fourth position such that the light from the light source is reflected by the second light-reflecting device onto a third pixel of the display screen, the third pixel being different than the first pixel of the display screen that corresponds to the first light-reflecting device and different than the second pixel of the display screen that corresponds to the second light-reflecting device.

6. The method according to claim 1, further comprising the step of positioning the reflective surface of a third of the light-reflecting devices in a position such that the light from the light source is reflected by the third light-reflecting device onto the first pixel of the display screen that corresponds to the first light-reflecting device.

7. The method according to claim 6, further comprising the step of positioning the reflective surface of the second light-reflecting device in a third position such that the light from the light source is reflected by the second light-reflecting device onto one of the pixels of the display screen that is different than the first pixel of the display screen that corresponds to the first light-reflecting device and different than the second pixel of the display screen that corresponds to the second light-reflecting device.

8. The method according to claim 1, wherein the identifying step includes the sub-steps of:
   capturing an image that is displayed on the display screen; and
   comparing the image that is captured with an image that should appear on the display screen.

9. The method according to claim 1, wherein the identifying step includes the sub-step of measuring a capacitance associated with each of the light-reflecting devices.

10. The method according to claim 1, further comprising the step of positioning the reflective surface of the second light-reflecting device in a third position such that the light from the light source is reflected by the second light-reflecting device onto a third pixel of the display screen, the third pixel being different than the first pixel of the display screen that corresponds to the first light-reflecting device and different than the second pixel of the display screen that corresponds to the second light-reflecting device.

11. A method for compensating for a defective light-reflecting device within an array of light-reflecting devices, each of the light-reflecting devices selectively reflecting light from a light source onto a corresponding pixel of a display screen, the method comprising the steps of:
   identifying a first of the light-reflecting devices that is defective;
   positioning at least a second of the light-reflecting devices such that the light from the light source is reflected by the second light-reflecting device onto the pixel of the display screen that corresponds to the first light-reflecting device;
   positioning the second light-reflecting device such that the light from the light source is reflected by the second light-reflecting device onto the pixel of the display screen that corresponds to the second light-reflecting device;
   positioning the second light-reflecting device such that the light from the light source is reflected by the second light-reflecting device onto a light absorbing material; and
   positioning the second light-reflecting device such that the light from the light source is reflected by the second light-reflecting device onto a first pixel of the display screen, the first pixel being different than the pixel of the display screen that corresponds to the first light-reflecting device and different than the pixel of the display screen that corresponds to the second light-reflecting device.

12. A method for compensating for a defective light-reflecting device within an array of light-reflecting devices, each of the light-reflecting devices selectively reflecting light from a light source onto a corresponding pixel of a display screen, the method comprising the steps of:
   identifying a first of the light-reflecting devices that is defective;
   positioning at least a second of the light-reflecting devices such, that the light from the light source is reflected by the second light-reflecting device onto the pixel of the display screen that corresponds to the first light-reflecting device; and
   positioning the second light-reflecting device such that the light from the light source is reflected by the second light-reflecting device onto a first pixel of the display screen, the first pixel being different than the pixel of the display screen that corresponds to the first light-reflecting device and different than the pixel of the display screen that corresponds to the second light-reflecting device.

* * * * *